(12) United States Patent  (10) Patent No.: US 6,970,805 B1
Bierma et al.  (45) Date of Patent: Nov. 29, 2005

(54) ANALYSIS OF DATA PROCESSING SYSTEM PERFORMANCE

(75) Inventors: Michael J. Bierma, New Brighton, MN (US); Chhung-Jen Chen, Circle Pines, MN (US); Gerald E. Hartmann, Minneapolis, MN (US)

(73) Assignee: Unisys Corporatiion, Blue Bell, PA (US)

( * ) Notice: Subject to any disclaimer, the term of this patent is extended or adjusted under 35 U.S.C. 154(b) by 110 days.

(21) Appl. No.: 10/744,995

(22) Filed: Dec. 23, 2003

(51) Int. Cl.[7] .......................... G06F 15/00; G06F 11/30
(52) U.S. Cl. ..................................... 702/182
(58) Field of Search ............... 702/182, 108, 702/127; 714/47, 48; 709/223–226

(56) References Cited

U.S. PATENT DOCUMENTS

| 6,067,412 A * | 5/2000 | Blake et al. ................. 718/102 |
| 6,405,327 B1 * | 6/2002 | Sipple et al. ................. 714/39 |

\* cited by examiner

Primary Examiner—Bryan Bui
Assistant Examiner—Demetrius Pretlow
(74) Attorney, Agent, or Firm—LeRoy D. Maunu; Charles A. Johnson; Mark D. Starr

(57) ABSTRACT

Method and system for determining an optimal workload level for a data processing system. In various embodiments samples of system operating characteristics are collected. Each sample includes a workload level, a throughput level, and one or more performance metrics having values used in detection of a bottleneck condition. A bottleneck condition exists if the workload level, the throughput level, and one or more of the performance metrics in a sample have values equal to a predetermined set of values defined as a bottleneck condition. From the samples, a first workload level is identified that corresponds to the sample having a greatest throughput level. A workload level is selected from among workload levels of one or more samples as the optimal workload level, where, in each of the one or more samples the workload level is less than the first workload level, the throughput level is less than the greatest throughput level, and no bottleneck condition is indicated by the performance metrics.

22 Claims, 4 Drawing Sheets

ANALYSIS OF DATA PROCESSING SYSTEM PERFORMANCE

FIELD OF THE INVENTION

The present disclosure relates to analyzing the performance of a data processing system.

BACKGROUND OF THE INVENTION

Large-scale data processing systems are often used in hosting mission critical software applications. For example, an airline may have one or more large scale systems that host its passenger reservation application and various other related applications. Banks, retailers and other businesses have analogous data processing needs.

With the advent of Web browsers, a great deal of business is being conducted over the Internet, and customers have close interaction with business' data processing systems. For example, a traveler may purchase a ticket directly from an airline via the airline's web site, a bank customer may pay bills via the bank's Internet-based bill paying service, and countless customers buy goods from retailers over the Internet.

The performance level of a business's data processing system may influence a current transaction being conducted with a customer, and might also affect the customer's future decisions in selecting with whom to do business. Thus, if the business' data processing system performs slowly in interacting with the customer, the customer may turn to a competitor in hopes of faster service.

Many factors may influence the level at which a data processing system is able to perform it's programmed functions. The factors include the particular hardware and software configuration of the system, as well as the processing load being placed on the system. Example system hardware characteristics that influence performance include the number and speed of CPUs, the amount of memory, the I/O bandwidth and the characteristics of many other system components. Example software characteristics might include configuration settings that control buffer sizes, numbers of active threads and other measures taken by software to self-impose limits on the consumption of system resources. The performance level of a data processing system may also be influenced by a varying processing load. For example, in the customer interface applications mentioned above the number of users interacting with the system will influence the system's performance level, and the number of users may vary by time of day, time of month, or time of year.

The responsibility for maintaining a system at an acceptable performance level is with the system administrator (SA). Addressing performance-related issues is generally best done by an experienced SA. It may take many years of working with a particular class of system before an SA is able to quickly identify and address a performance problem. Furthermore, the ability to assess when a system will begin to exhibit performance problems may also require considerable systems administration experience. The number of highly experienced SAs is generally much less than the need for their expertise. Large-scale systems are found in businesses worldwide, and the need for specific expertise may arise at any hour of the day.

A system and a method that address these and other related problems are therefore desirable.

SUMMARY OF THE INVENTION

The various embodiments of the invention assist in determining an optimal workload level for a data processing system. Samples of system operating characteristics are collected. Each sample includes a workload level, a throughput level, and one or more performance metrics having values used in detection of a bottleneck condition. A bottleneck condition exists if the workload level, the throughput level, and one or more of the performance metrics in a sample have values equal to a predetermined set of values defined as a bottleneck condition. From the samples, a first workload level is identified that corresponds to the sample having a greatest throughput level. A workload level is selected from among workload levels of one or more samples as the optimal workload level, where, in each of the one or more samples the workload level is less than the first workload level, the throughput level is less than the greatest throughput level, and no bottleneck condition is indicated by the performance metrics.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

The various embodiments of the invention provide an automated mechanism for determining an optimal workload level that the system can support, a workload level beyond which any additional workload will degrade the systems performance, and a baseline against which to compare system performance as the system or applications running on the system change. System administrators, database administrators, or optimization tools may find this information useful in maintaining a desired level of performance of the system. It would be desirable to be able to anticipate the onset of performance degradation so that measures can be taken to either avoid a system slowdown or upgrade the system to achieve a greater level of performance.

During system run-time processing, various operating characteristics of the system are sampled and recorded. Included in these operating characteristics are one or more characteristics that may be selected for use as the workload level and one or more characteristics that may be selected for use as the throughput level. Workload is generally expressed in terms of the number of active units of requested work at a moment in time, and throughput is expressed as the number of units of work completed per unit time.

The throughput levels of the system are then analyzed over the whole range of workload levels present in a sample data set. As observed workload levels increase, points of degraded performance (decreased throughput vs. increased workload) are analyzed to identify bottleneck conditions causing the degraded performance. Additionally, the optimal level of performance achieved for the measured workload is determined for the current configuration and processing resources present in the system.

Figure 1A:
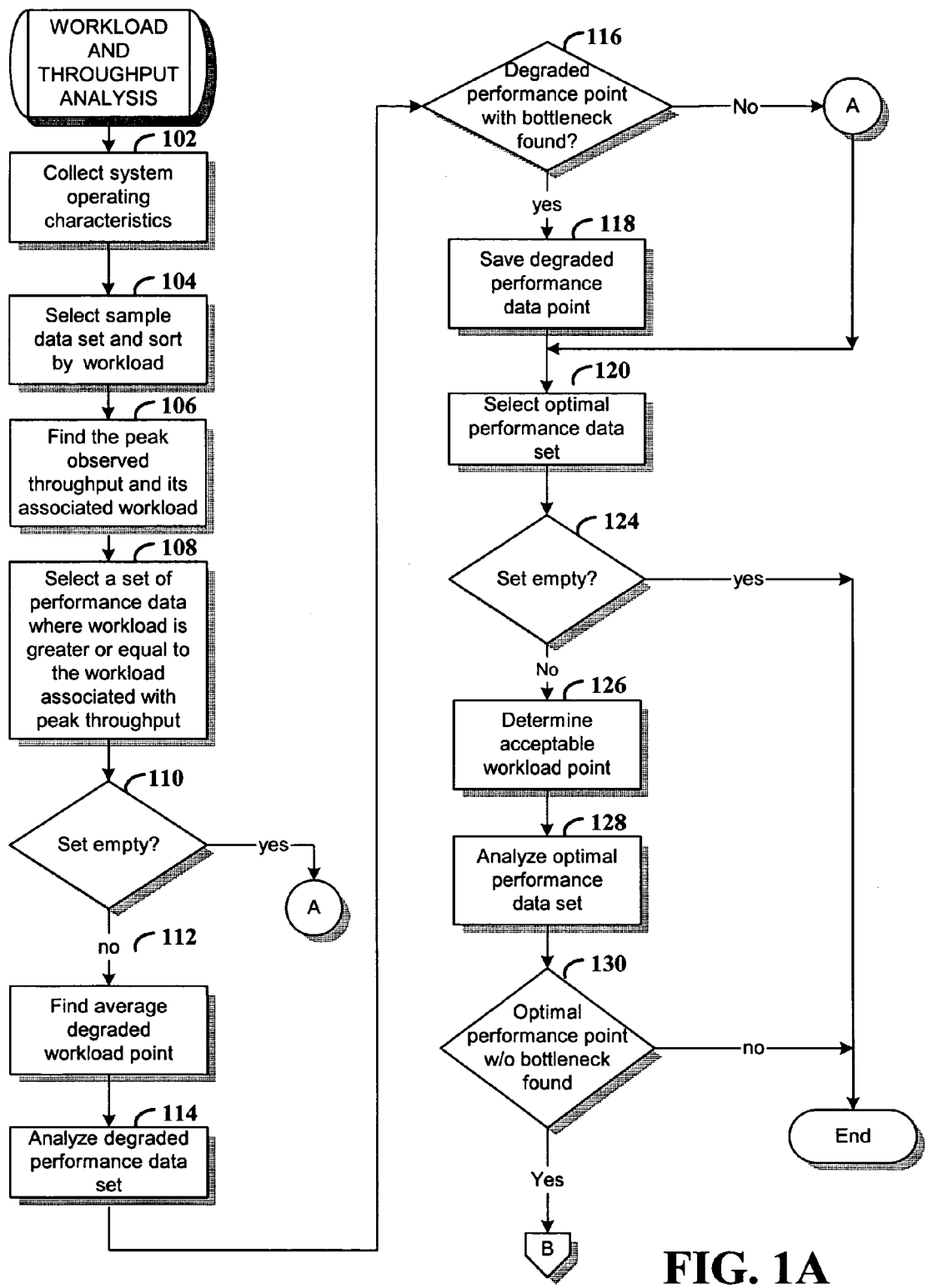
FIGS. 1A and 1B are flowcharts of an example process for analyzing the workload and throughput of a system in accordance with various embodiments of the invention.
Figure 1B:
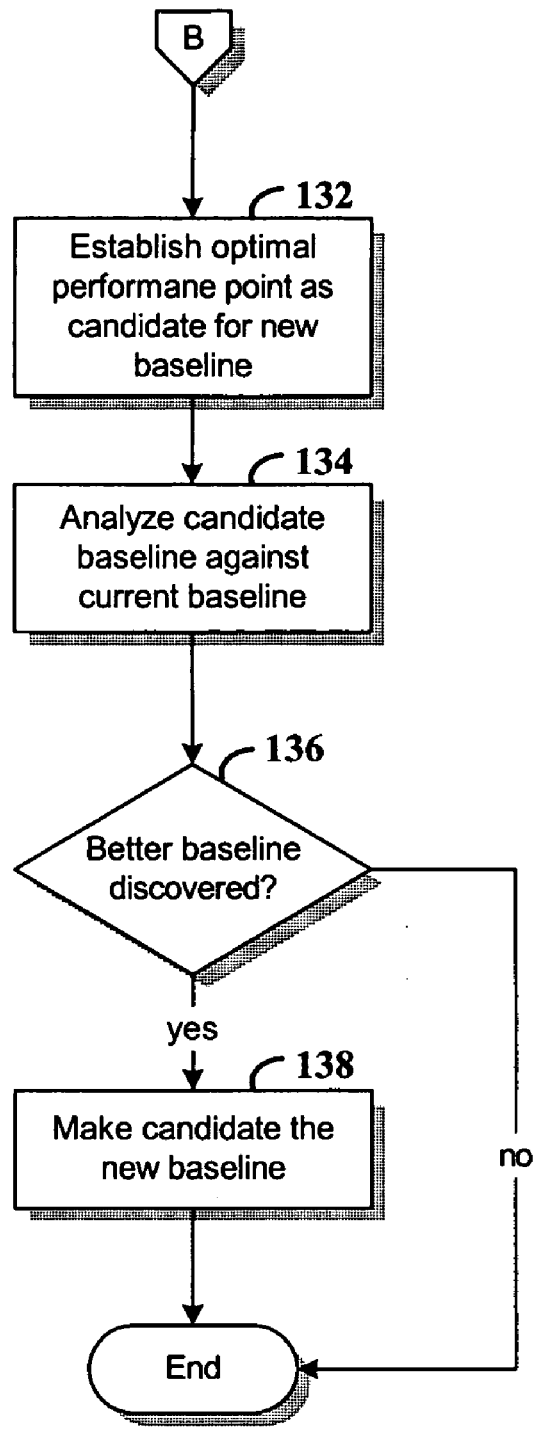
Figure 2A:
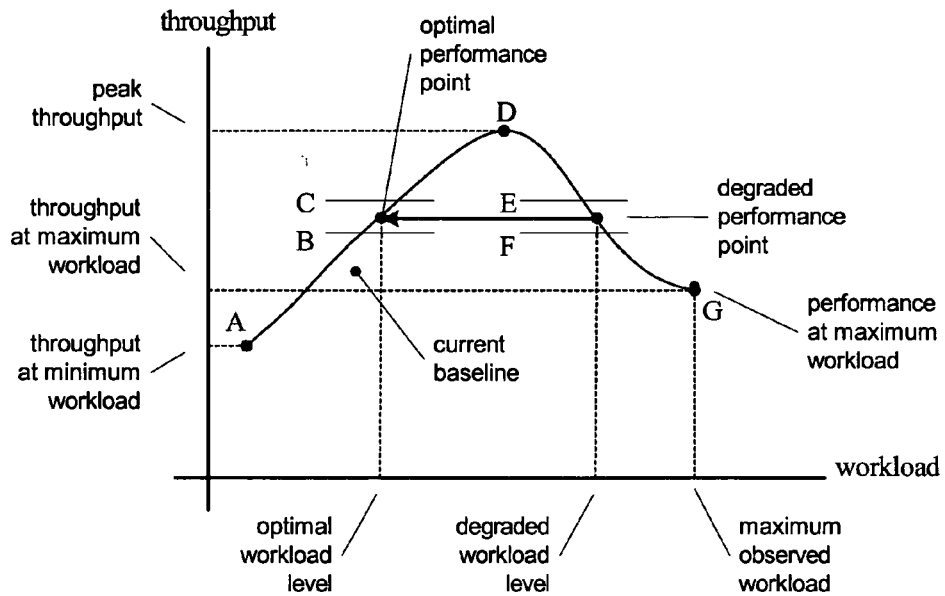
FIG. 2A is a graph of sampled throughput levels versus corresponding workload levels.
Figure 2B:
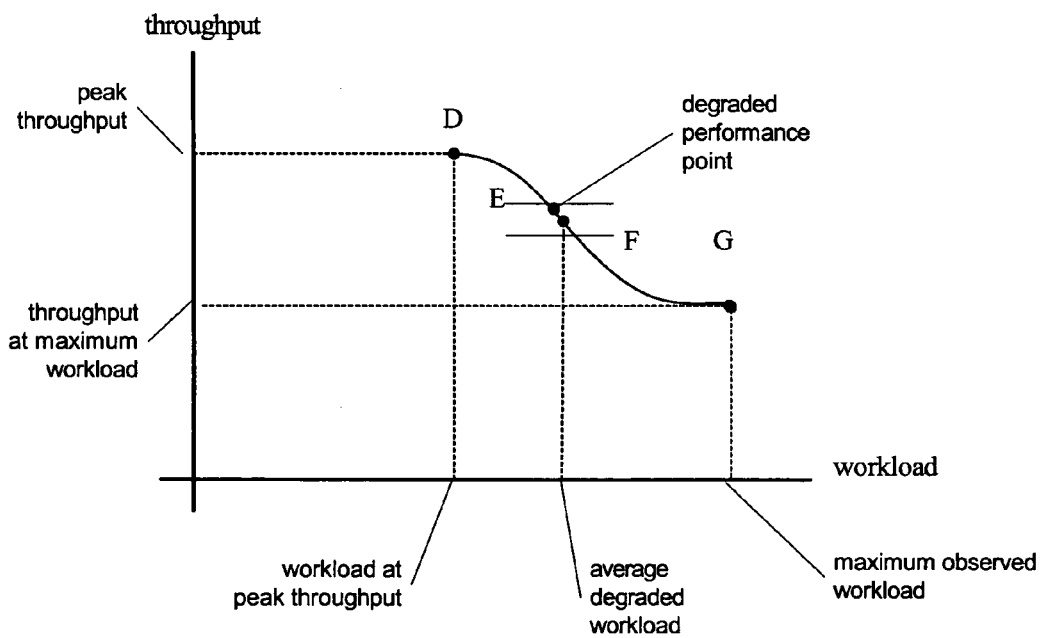
FIG. 2B is a graph of a degraded performance data set, which consists of data points selected from the data points in the graph of FIG. 2A.
Figure 2C:
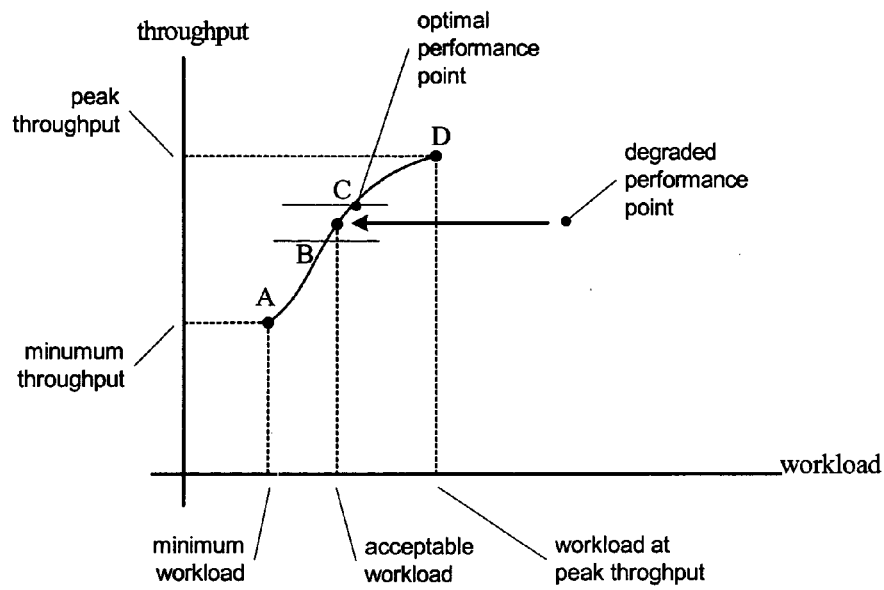
FIG. 2C is a graph of an optimal performance data set, which consists of data points selected from the data points in the graph of FIG. 2A.

FIGS. 1A and 1B are flowcharts of an example process for analyzing the workload and throughput of a system in accordance with various embodiments of the invention. The graphs of FIGS. 2A, 2B, and 2C are referenced in conjunction with the description of the process of FIGS. 1A and 1B to illustrate various concepts related to the embodiments of the invention. The graphs illustrate an ideal data set to be analyzed, and provide an example of the relationship between system workload and system throughput. Various points in the graphs are labeled to illustrate the names of the various data points used in the process. It will be appreciated that an actual sample set of system throughput and workload data would not produce the clean curve that is illustrated. Rather some data points may coincide with the curve, but many or most of the data points would be near the curve.

The analysis begins with collecting system operating characteristics during runtime operations of a target system (step 102). For example, while the system is executing the various applications that provide services to users, operating characteristics of the system are sampled and recorded as sample data. Examples of operating characteristics include processor utilization, memory utilization, paging activity, disk queue length, I/O queue length, transactions per second, active SQL user connections, the number of active transactions and many other recognized system performance characteristics. Each time the chosen set of operating characteristics of the system are sampled, the sample data is time stamped and stored. For purposes of explanation, sample data refers to the values of the operating characteristics captured at a particular time and stored, and sample data set refers to the collection of sample data captured and stored over a selected time interval.

Certain ones of these operating characteristics may be categorized or viewed as indicative of the system's throughput or workload. An example operating characteristic that indicates a level of throughput is the number of transactions per second, and an example operating characteristic that indicates a workload level is the number of active SQL user connections. The system's throughput as a function of the workload may be viewed as indicating the performance level of the system.

FIG. 2A is a graph of sampled throughput levels versus the corresponding workload levels. As mentioned above, it will be appreciated that the actual data points would not likely conform to a smooth curve but would instead be near the points on the curve. The smooth curve is used for ease of illustration. Points in FIG. 2A are also labeled in FIGS. 2B and 2C for ease of reference.

Returning now to FIG. 1A, the first phase of the process determines whether the system is exhibiting degraded performance characteristics and determines a workload level at which the system's performance will begin to degrade as workload increases. First, a sample data set, for a selected time interval, is selected and sorted (ascending order) by workload level (step 104).

The peak throughput and its associated workload are found (step 106), and all workload levels greater than the workload level associated with the peak throughput are selected from the sample data set (step 108). This selected data is the degraded performance data set, as illustrated by the points D through G in FIG. 2B. If this data set is empty (decision step 110), then the process to locate a degraded performance point ends and the analysis to find an optimal performance point begins (FIG. 1A, circle A).

If the degraded performance data set is not empty, then the average degraded workload level of this data set is calculated (step 112). The average degraded workload level is the total of the workload levels from the degraded performance data set divided by the number of samples in the set. The average degraded workload level is illustrated in the graph of FIG. 2B and is used to select a neighboring set of points (points between lines E and F in FIG. 2B) for analysis. The operating characteristics associated with these neighboring samples are analyzed for performance bottleneck conditions, starting with the point at line E and progressing to the point at line F (step 114). The first point that has a detected bottleneck condition is established as the degraded performance point (step 118; also FIG. 2B). This is the point at which system performance is already degraded, and any further increase in the workload will further degrade the throughput level of the system. The next phase of the processing is to find an optimal performance point (beginning at step 120).

A performance bottleneck is a constraining condition, within the components of a system (the processors, memory, I/O subsystem, network, and the like, not shown) or application running on the system, that limits the system's ability to perform additional work or that limits the system's ability to perform the work in the same (or less) amount of time. The determination of a bottleneck condition may be based on exceeding threshold limits on system run-time metrics, expert knowledge (rules) of how a system should ideally operate, or a combination of factors. For example, if the queue of requests for work by a processor exceeds 2 requests, it may be an indication of a processor bottleneck condition.

The next phase of the process determines whether there is an optimal (observed) performance point for the system. The optimal performance point is the point at which the system has sufficient capacity to handle the corresponding workload level without exhibiting bottleneck conditions, and still have some additional capacity to accommodate occasional spikes in the workload.

All samples with workload levels less than the workload level associated with the peak throughput (samples from points A through D in FIG. 2C) are selected from the collected performance data (step 120). This selected data is referred to as the optimal performance data set. If this data set is empty (decision step 124), then there is insufficient data to complete the analysis and the process is terminated. If the data set is not empty, then an acceptable workload level is determined in one of two ways (step 126), depending on whether a degraded performance point exists. If a degraded performance point exists (from the processing in the previous phase) then the associated throughput level is used to locate a matching throughput level with an associated workload level (acceptable workload, FIG. 2C) that is less than the workload level at the peak throughput (point D in FIG. 2C). If a degraded performance point does not exist, then the acceptable workload point is determined by averaging the workload levels at points A and D in FIG. 2C.

It may be more desirable to use a data point in a subset of the degraded performance data set to derive the optimal performance data set than to use the average of the workload levels between points A and D. During the collection phase the system may experience very low workload levels. This may result in point A being very low, which makes the Average lower, thereby resulting in a lower optimal performance data set than what may be desirable. Thus, the average is used only if the degraded performance point does not exist.

Next, the acceptable workload value is used to select neighboring performance points (points from line B to C in FIG. 2C) for analysis. The performance data associated with these points is analyzed for performance bottleneck conditions, starting with the data point at line C and progressing toward line B (step 128). The first point that does not have a detected bottleneck condition is established as the optimal (observed) performance point (FIG. 2C and FIG. 1B, step 132). If an optimal performance point is not found, then the analysis process ends.

The final phase of the process determines whether the optimal performance point should be used as a new performance baseline for the system. The workload level, throughput level, and other operating characteristics at the optimal performance point are compared to the existing performance baseline for the system (decision 134). If the new optimal performance point has a greater performance level (decision 136), then the sample is saved as the new performance baseline for the system (step 138). Otherwise, the existing performance baseline is retained. It will be appreciated that whether one performance level is greater than another performance level may be determined according to the type of system, system configuration and various other environment-specific factors. Thus, relative magnitude of a performance level will likely be a function of the workload level, the throughput level and the various other operating characteristics. FIG. 2A illustrates a current baseline and a new optimal performance point.

Figure 3:
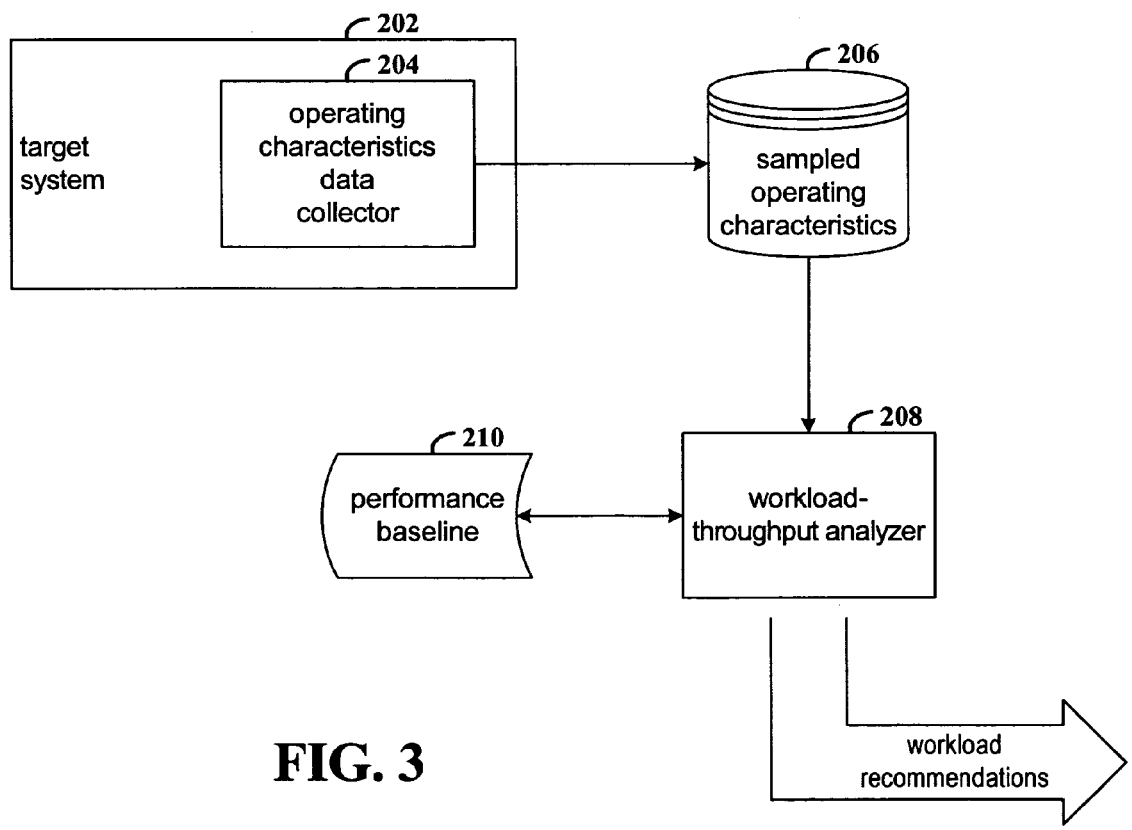
FIG. 3 is a block diagram of an example arrangement for identifying an optimal workload level in accordance with various embodiments of the invention.

FIG. 3 is a block diagram of an example arrangement for identifying an optimal workload level in accordance with various embodiments of the invention. Target system 202 is the data processing system for which the optimal workload level is to be determined. Collector 204 is a program that samples operating characteristics of target system 202 while the system is running a selected suite of applications. The sampled operating characteristics are stored in persistent storage 206.

The scenarios in which the samples are gathered may be determined by the system administrator according to system usage patterns. For example, the duration over which the samples are collected, the time of day, day of week or day of the month in which samples are taken, as well as the sampling rate may vary from system to system or sample session to sample session according to the applications that are running and user's habits of using those applications.

The sample data may be stored in a manner that is most suitable for update by the collector 204 and for querying by the analyzer 208. For example, a flat file, a relational database, or data warehouse may be used to meet the storage and retrieval needs. Analyzer 208 reads the sampled operating characteristics, and in one embodiment determines an optimal workload level as described above. The sampled operating characteristics associated with this optimal workload level are stored as a performance base line 210. The performance baseline is used for comparison in subsequent analyses of additional sampled operating characteristics as described above.

Various workload recommendations may be output by the analyzer for consideration by the system administrator. In one embodiment, the optimal workload level is output. The administrator may then monitor the system to detect when the system is approaching the optimal workload level, how often the system exceeds the optimal workload level, the length of time that the optimal workload level is exceeded and other circumstances in which the system may begin to exhibit degraded performance. The administrator may then select a suitable course of action based on the observed workload levels. For example, the administrator may limit access to the system, reconfigure hardware and/or software resources, or recommend a hardware upgrade(s) to the system.

Those skilled in the art will appreciate that various alternative computing arrangements would be suitable for hosting the processes of the different embodiments of the present invention. In addition, the processes may be provided via a variety of computer-readable media or delivery channels such as magnetic or optical disks or tapes, electronic storage devices, or as application services over a network.

In addition to the embodiments of the invention described above, other aspects and embodiments will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for determining an optimal workload level for a data processing system, comprising:

collecting samples of system operating characteristics, each sample including a workload level, a throughput level, and one or more performance metrics having values used in detection of a bottleneck condition, wherein a bottleneck condition exists if the workload level, the throughput level, and one or more of the performance metrics in a sample have values equal to a predetermined set of values defined as a bottleneck condition;

identifying a first workload level that corresponds to the sample having a greatest throughput level; and selecting a workload level from among workload levels of one or more samples as the optimal workload level, wherein in each of the one or more samples the workload level is less than the first workload level, the throughput level is less than the greatest throughput level, and no bottleneck condition is indicated by the performance metrics.

2. The method of claim 1, further comprising:

selecting a subset of the samples as a degraded performance data set, wherein the degraded performance data set includes samples with workload levels greater than the first workload level, and if the degraded performance data set is not empty selecting a degraded performance sample from the degraded performance data set;

selecting a subset of the samples as an optimal performance data set, wherein the optimal performance data set includes samples with workload levels less than the first workload level; and selecting a sample from the optimal performance data set as a function of a workload level of the degraded performance sample, wherein the workload level of the sample is the optimal workload level.

3. The method of claim 2, further comprising:
  determining an average degraded workload level as an average of workload levels of samples in the degraded performance data set; and
  analyzing samples in the degraded performance data set having workload levels within a range from a selected amount greater to a selected amount less than the average degraded workload level in order from a least workload level to a greatest workload level and establishing a first-encountered sample with a bottleneck condition as the degraded performance sample.

4. The method of claim 2, further comprising:
  determining an acceptable workload level in the optimal performance data set as a function of the workload level of the degraded performance sample; and
  analyzing samples in the optimal performance data set having workload levels within a range from a selected amount greater to a selected amount less than the acceptable workload level in order from a greatest workload level to a least workload level and establishing the workload level of a first-encountered sample without a bottleneck condition as the optimal workload level.

5. The method of claim 4, wherein determining an acceptable workload level comprises finding a sample in the optimal performance data set with a workload level that is approximately equal to the workload level of the degraded performance sample.

6. The method of claim 2, further comprising:
  if the degraded performance data set is empty, determining an acceptable workload level in the optimal performance data set as an average of a least workload level in the optimal performance data set and the first workload level; and
  analyzing samples in the optimal performance data set with workload levels within a range from a selected amount greater to a selected amount less than the acceptable workload level in order from a greatest workload level to a least workload level and establishing the workload level of a first-encountered sample without a bottleneck condition as the optimal workload level.

7. The method of claim 1, further comprising:
  establishing a baseline performance level;
  repeating the steps of identifying a first workload level and selecting the optimal workload level;
  determining a candidate baseline performance level as a function of the workload level, throughput level, and one or more performance metrics from the sample of the optimal workload level;
  replacing the baseline performance level with the candidate performance level if the candidate performance level is greater than the baseline performance level.

8. A system for determining an optimal workload level for a data processing system, comprising:
  a sample collector configured to collect samples of system operating characteristics, each sample including a workload level, a throughput level, and one or more performance metrics having values used in detection of a bottleneck condition, wherein a bottleneck condition exists if the workload level, the throughput level, and one or more of the performance metrics in a sample have values equal to a predetermined set of values defined as a bottleneck condition;
  an analyzer configured to identify a first workload level that corresponds to the sample having a greatest throughput level and select a workload level from among workload levels of one or more samples as the optimal workload level, wherein in each of the one or more samples the workload level is less than the first workload level, the throughput level is less than the greatest throughput level, and no bottleneck condition is indicated by the performance metrics.

9. The system of claim 8, wherein the analyzer is further configured to select a subset of the samples as a degraded performance data set, wherein the degraded performance data set includes samples with workload levels greater than the first workload level, and if the degraded performance data set is not empty selecting a degraded performance sample from the degraded performance data set, select a subset of the samples as an optimal performance data set, wherein the optimal performance data set includes samples with workload levels less than the first workload level, and select a sample from the optimal performance data set as a function of a workload level of the degraded performance sample, wherein the workload level of the sample is the optimal workload level.

10. The system of claim 9, wherein the analyzer is further configured to determine an average degraded workload level as an average of workload levels of samples in the degraded performance data set, analyze samples in the degraded performance data set having workload levels within a range from a selected amount greater to a selected amount less than the average degraded workload level in order from a least workload level to a greatest workload level, and establish a first-encountered sample with a bottleneck condition as the degraded performance sample.

11. The system of claim 9, wherein the analyzer is further configured to determine an acceptable workload level in the optimal performance data set as a function of the workload level of the degraded performance sample, analyze samples in the optimal performance data set having workload levels within a range from a selected amount greater to a selected amount less than the acceptable workload level in order from a greatest workload level to a least workload level, and establish the workload level of a first-encountered sample without a bottleneck condition as the optimal workload level.

12. The system claim 11, wherein the analyzer is further configured to find a sample in the optimal performance data set with a workload level that is approximately equal to the workload level of the degraded performance sample in determining an acceptable workload level.

13. The system of claim 9, wherein the analyzer is further configured to, if the degraded performance data set is empty, determine an acceptable workload level in the optimal performance data set as an average of a least workload level in the optimal performance data set and the first workload level, analyze samples in the optimal performance data set with workload levels within a range from a selected amount greater to a selected amount less than the acceptable workload level in order from a greatest workload level to a least workload level, and establish the workload level of a first-encountered sample without a bottleneck condition as the optimal workload level.

14. The system of claim 8, wherein the analyzer is further configured to establish a baseline performance level, repeat the steps of identifying a first workload level and selecting the optimal workload level, determine a candidate baseline performance level as a function of the workload level, throughput level, and one or more performance metrics from the sample of the optimal workload level, and replace the baseline performance level with the candidate performance level if the candidate performance level is greater than the baseline performance level.

15. An article of manufacture for determining an optimal workload level for a data processing system, comprising:
a computer-readable medium configured with instructions for causing a processor to perform the steps of,
collecting samples of system operating characteristics, each sample including a workload level, a throughput level, and one or more performance metrics having values used in detection of a bottleneck condition, wherein a bottleneck condition exists if the workload level, the throughput level, and one or more of the performance metrics in a sample have values equal to a predetermined set of values defined as a bottleneck condition;
identifying a first workload level that corresponds to the sample having a greatest throughput level; and
selecting a workload level from among workload levels of one or more samples as the optimal workload level, wherein in each of the one or more samples the workload level is less than the first workload level, the throughput level is less than the greatest throughput level, and no bottleneck condition is indicated by the performance metrics.

16. The article of manufacture of claim 15, wherein the computer-readable medium is further configured with instructions for causing a computer to perform the steps of:
selecting a subset of the samples as a degraded performance data set, wherein the degraded performance data set includes samples with workload levels greater than the first workload level, and if the degraded performance data set is not empty selecting a degraded performance sample from the degraded performance data set;
selecting a subset of the samples as an optimal performance data set, wherein the optimal performance data set includes samples with workload levels less than the first workload level; and
selecting a sample from the optimal performance data set as a function of a workload level of the degraded performance sample, wherein the workload level of the sample is the optimal workload level.

17. The article of manufacture of claim 16, wherein the computer-readable medium is further configured with instructions for causing a computer to perform the steps of:
determining an average degraded workload level as an average of workload levels of samples in the degraded performance data set; and
analyzing samples in the degraded performance data set having workload levels within a range from a selected amount greater to a selected amount less than the average degraded workload level in order from a least workload level to a greatest workload level and establishing a first-encountered sample with a bottleneck condition as the degraded performance sample.

18. The article of manufacture of claim 16, wherein the computer-readable medium is further configured with instructions for causing a computer to perform the steps of:
determining an acceptable workload level in the optimal performance data set as a function of the workload level of the degraded performance sample; and
analyzing samples in the optimal performance data set having workload levels within a range from a selected amount greater to a selected amount less than the acceptable workload level in order from a greatest workload level to a least workload level and establishing the workload level of a first-encountered sample without a bottleneck condition as the optimal workload level.

19. The article of manufacture of claim 18, wherein the computer-readable medium is further configured with instructions for causing a computer to perform the step of finding a sample in the optimal performance data set with a workload level that is approximately equal to the workload level of the degraded performance sample in determining an acceptable workload level comprises.

20. The article of manufacture of claim 16, wherein the computer-readable medium is further configured with instructions for causing a computer to perform the steps of:
if the degraded performance data set is empty, determining an acceptable workload level in the optimal performance data set as an average of a least workload level in the optimal performance data set and the first workload level; and
analyzing samples in the optimal performance data set with workload levels within a range from a selected amount greater to a selected amount less than the acceptable workload level in order from a greatest workload level to a least workload level and establishing the workload level of a first-encountered sample without a bottleneck condition as the optimal workload level.

21. The article of manufacture of claim 15, wherein the computer-readable medium is further configured with instructions for causing a computer to perform the steps of:
establishing a baseline performance level;
repeating the steps of identifying a first workload level and selecting the optimal workload level; and
determining a candidate baseline performance level as a function of the workload level, throughput level, and one or more performance metrics from the sample of the optimal workload level; and
replacing the baseline performance level with the candidate performance level if the candidate performance level is greater than the baseline performance level.

22. An apparatus for determining an optimal workload level for a data processing system, comprising:
means for collecting samples of system operating characteristics, each sample including a workload level, a throughput level, and one or more performance metrics having values used in detection of a bottleneck condition, wherein a bottleneck condition exists if the workload level, the throughput level, and one or more of the performance metrics in a sample have values equal to a predetermined set of values defined as a bottleneck condition;
means for identifying a first workload level that corresponds to the sample having a greatest throughput level; and
means for selecting a workload level from among workload levels of one or more samples as the optimal workload level, wherein in each of the one or more samples the workload level is less than the first workload level, the throughput level is less than the greatest throughput level, and no bottleneck condition is indicated by the performance metrics.

* * * * *